(12) United States Patent
Sharma et al.

(10) Patent No.: US 12,543,027 B2
(45) Date of Patent: Feb. 3, 2026

(54) METHODS AND APPARATUSES FOR PROVIDING EXTENDED ACCESS TO A LOCAL AREA DATA NETWORK, COMPUTER PROGRAM AND COMPUTER PROGRAM PRODUCT

(71) Applicant: Telefonaktiebolaget LM Ericsson (publ), Stockholm (SE)

(72) Inventors: Nipun Sharma, New Delhi (IN); Hans Eriksson, Sollentuna (SE); Paolo Debenedetti, Genoa (IT); Raoul Fiorone, Genoa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 314 days.

(21) Appl. No.: 18/246,349

(22) PCT Filed: Sep. 25, 2020

(86) PCT No.: PCT/EP2020/077016
§ 371 (c)(1),
(2) Date: Mar. 23, 2023

(87) PCT Pub. No.: WO2022/063413
PCT Pub. Date: Mar. 31, 2022

(65) Prior Publication Data
US 2023/0370824 A1    Nov. 16, 2023

(51) Int. Cl.
*H04W 4/50* (2018.01)
*H04W 4/021* (2018.01)
(Continued)

(52) U.S. Cl.
CPC ............ *H04W 4/50* (2018.02); *H04W 4/021* (2013.01); *H04W 76/12* (2018.02); *H04W 48/18* (2013.01)

(58) Field of Classification Search
CPC ....... H04W 4/50; H04W 4/021; H04W 76/12; H04W 48/18
See application file for complete search history.

(56) References Cited

U.S. PATENT DOCUMENTS

2017/0171902 A1*  6/2017  Tillman ............... H04W 76/16
2018/0098262 A1*  4/2018  Chakraborty ..... H04W 36/0085
(Continued)

FOREIGN PATENT DOCUMENTS

| WO | 2020013469 A1 | 1/2020 | |
|---|---|---|---|
| WO | 2020105548 A1 | 5/2020 | |
| WO | WO-2022063413 A1 * | 3/2022 | ............ H04W 4/021 |

OTHER PUBLICATIONS

International Search Report and Written Opinion dated May 10, 2021 for International Patent Application No. PCT/EP2020/077016 filed Sep. 25, 2020, consisting of 14-pages.
(Continued)

*Primary Examiner* — Julio R Perez
(74) *Attorney, Agent, or Firm* — Weisberg I.P. Law, P.A.

(57) ABSTRACT

Embodiments described herein relate to methods and apparatuses for providing access to a first local area data network, LADN, to one or more wireless devices positioned in a second geographic area outside of a first geographic area associated with a first LADN. A method includes responsive to the one or more wireless devices requesting access to the first LADN via an mobile edge network node in the second geographic area, dynamically generating a transport communication channel between the mobile edge network node and a mobile edge computing server, MEC, host providing the first LADN, and allowing the one or more wireless devices to access the first LADN using the transport communication channel.

16 Claims, 13 Drawing Sheets

(51) Int. Cl.
*H04W 76/12* (2018.01)
*H04W 48/18* (2009.01)

(56) References Cited

U.S. PATENT DOCUMENTS

| | | | | |
|---|---|---|---|---|
| 2019/0007992 | A1* | 1/2019 | Kim | H04W 76/27 |
| 2022/0400425 | A1* | 12/2022 | Cakulev | H04W 48/08 |
| 2023/0104162 | A1* | 4/2023 | Hallenstål | H04W 76/11 370/328 |
| 2023/0163905 | A1* | 5/2023 | Liu | H04W 48/18 370/329 |
| 2024/0015630 | A1* | 1/2024 | Talebi Fard | H04W 8/08 |
| 2024/0236836 | A1* | 7/2024 | Bangolae | H04W 8/22 |

OTHER PUBLICATIONS

3GPP TR 23.748 V0.3.0; 3rd Generation Partnership Project; Technical Specification Group Services and System Aspects; Study on enhancement of support for Edge Computing in the 5G Core network (5GC) (Release 17); Jan. 2020, consisting of 40-pages.

3gpp tr 23.791 V16.2.0; 3rd Generation Partnership Project; Technical Specification Group Services and System Aspects; Study of Enablers for Network Automation for 5G (Release 16); Jun. 2019, consisting of 124-pages.

3GPP TS 23.501 V16.6.0; 3rd Generation Partnership Project; Technical Specification Group Services and System Aspects; System architecture for the 5G System (5GS); Stage 2 (Release 16); Sep. 2020, consisting of 447-pages.

* cited by examiner

METHODS AND APPARATUSES FOR PROVIDING EXTENDED ACCESS TO A LOCAL AREA DATA NETWORK, COMPUTER PROGRAM AND COMPUTER PROGRAM PRODUCT

CROSS-REFERENCE TO RELATED APPLICATION

This application is a Submission Under 35 U.S.C. § 371 for U.S. National Stage Patent Application of International Application Number: PCT/EP2020/077016, filed Sep. 25, 2020 entitled "METHODS AND APPARATUSES FOR PROVIDING EXTENDED ACCESS TO A LOCAL AREA DATA NETWORK, COMPUTER PROGRAM AND COMPUTER PROGRAM PRODUCT," the entirety of which is incorporated herein by reference.

TECHNICAL FIELD

Embodiments described herein relate to methods and apparatuses for providing extended access to a local area data network (LADN). In particular, access is provided to one or more wireless devices positioned in a second geographic area outside of a first geographic area associated with a first LADN.

BACKGROUND

In the 5G system specifications there are a set of new functionalities that leverage Edge Computing as technology enabler for superior performances and user experience as described in 3GPP TS 23.791 and TS 23.501. Edge computing enables operator and 3rd party services to be hosted close to the wireless devices access point of attachment to the network. This helps to achieve an efficient service delivery through the reduced end-to-end latency and load on the transport network. Edge computing can be supported by any combination of the following enablers to realize the connection to edge computing:

- User plane (re)selection
- Local Routing and Traffic Steering
- Session and service continuity to enable UE and application mobility
- Application Function may influence UPF (re)selection and traffic routing via PCF or NEF (Network capability exposure)
- QoS and Charging for the traffic routed to the local Data Network
- Support of Local Area Data Network (LADN), as part of the UE subscription data from UDM, in a certain area where the applications are deployed.
- The 5G Core Network provides the means to select traffic to be routed to the applications in the local data network. A PDU Session may have multiple N6 interfaces towards the data network. The User Plane Functions (UPFs) that terminate these interfaces are said to support PDU Session Anchor functionality. Traffic steering by the UPF is supported by Uplink Classifiers that operate on a set of traffic filters matching the steered traffic, or alternatively by IPv6 multi-homing, where multiple IPv6 prefixes have been associated with the PDU session in question
- The ability of an Application Function to influence UPF (re)selection and traffic routing directly via the Policy Control Function (PCF) or indirectly via the Network Exposure Function (NEF), depends on the operator's policies
- The Session and Service Continuity (SSC) modes for different UE and application mobility scenarios.
- Support of Local Area Data Network (LADN) by the 5G Core Network by providing support to connect to the LADN in a certain area where the applications are deployed. The access to a LADN is only available in a specific LADN service area, defined as a set of Tracking Areas in the serving PLMN of the UE.

The PDU session has a PDU Session anchor in a central site and a PDU Session anchor in the local site. Only one of them provides the IP anchor point. The Edge Computing application traffic is selectively diverted to the local PDU Session anchor using UL Classifier or multihoming Branching Point (BP) technology. Re-anchoring of the local PDU Session anchor is used to optimize traffic routing for locally diverted traffic as the user moves.

TR 23.748 clearly identifies the need of IP anchor points and the possibility to divert IP traffic to local PDU sessions.

FIG. 1 illustrates a PLMN network connecting a distributed cloud and four associated MEC server hosts 101, 102, 103, 104. It will be appreciated that more MEC server hosts may exist. The MEC server hosts may provide a LADN service to wireless devices located in a geographical area served by each respective MEC server host.

However, sometimes a wireless device may be located outside of the geographical area associated with the MEC server host that provides a LADN service to which the wireless device is subscribed. In these occasions, the wireless device will not be able to access the LADN service, and will instead need to communicate with the PLMN to receive the service that would otherwise have been provided by the LADN. In these occasions, the performance of the service is not controlled by the MNO or enterprise that provided the LADN service. Instead, the overall performances of the 5G services may therefore be dependent on the PLMN, which might not be under the control of the MNO or of the enterprise.

SUMMARY

According to some embodiments there is provided a method in a mobile communication network for providing access to a first local area data network, LADN, to one or more wireless devices positioned in a second geographic area outside of a first geographic area associated with a first LADN. The method comprises responsive to the one or more wireless devices requesting access to the first LADN via an mobile edge network node in the second geographic area, dynamically generating a transport communication channel between the mobile edge network node and a mobile edge computing server, MEC, host providing the first LADN, and allowing the one or more wireless devices to access the first LADN using the transport communication channel.

According to some embodiments there is provided a method in a mobile edge network node communicating with one or more wireless devices located in a second geographic area outside of a first geographic area. The method comprises responsive to a request from a core network node, utilizing a dynamically generated transport communication channel between the mobile edge network node and a mobile edge computing server, MEC, host providing a first LADN to a first geographic area outside of the second geographic area, and providing the one or more wireless devices with access to the first LADN using the transport communication channel.

According to some embodiments there is provided a method in a mobile edge computing, MEC, server host providing a first local area data network, LADN, in a first geographical area. The method comprises responsive to a request from a core network node, utilizing a dynamically generated transport communication channel between a mobile edge network node and the MEC server host, and providing the one or more wireless devices located in a second geographic area outside of the first geographical area with access to the first LADN using the transport communication channel.

According to some embodiments there is provided a core network for providing access to a first local area data network, LADN, to one or more wireless devices positioned in a second geographic area outside of a first geographic area associated with a first LADN. The core network comprises processing circuitry configured to: responsive to the one or more wireless devices requesting access to the first LADN via an mobile edge network node in the second geographic area, dynamically generate a transport communication channel between the mobile edge network node and a mobile edge computing server, MEC, host providing the first LADN, and allow the one or more wireless devices to access the first LADN using the transport communication channel.

According to some embodiments there is provided a mobile edge network node communicating with one or more wireless devices located in a second geographic area outside of a first geographic area. The mobile edge network node comprises processing circuitry configured to responsive to a request from a core network node, utilizing a dynamically generated transport communication channel between the mobile edge network node and a mobile edge computing server, MEC, host providing a first LADN to a first geographic area outside of the second geographic area, and provide the one or more wireless devices with access to the first LADN using the transport communication channel.

According to some embodiments there is provided a mobile edge computing, MEC, server host providing a first local area data network, LADN, in a first geographical area. The method comprises responsive to a request from a core network node, utilizing a dynamically generated transport communication channel between a mobile edge network node and the MEC server host, and provide the one or more wireless devices located in a second geographic area outside of the first geographical area with access to the first LADN using the transport communication channel.

BRIEF DESCRIPTION OF THE DRAWINGS

For a better understanding of the embodiments of the present disclosure, and to show how it may be put into effect, reference will now be made, by way of example only, to the accompanying drawings, in which.

DESCRIPTION

Figure 1:
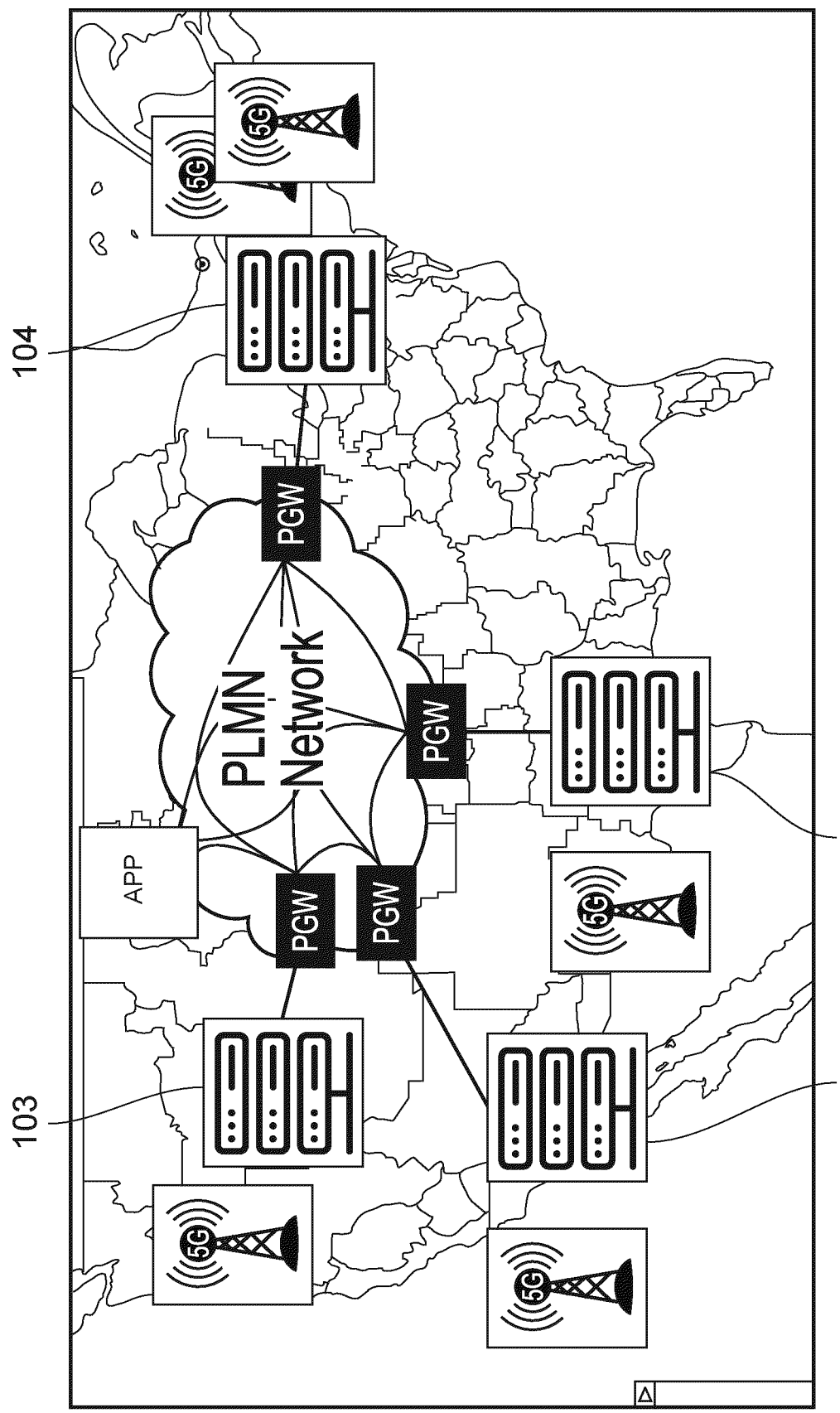
FIG. 1 illustrates a PLMN network connecting a distributed cloud and four associated MEC server hosts.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

A potential weakness in the performances of the 3GPP LADN implementation may be envisaged due to the dependency on the serving Public Land Mobile Network (PLMN) that might hinder the Key Performance Indicators (KPIs) and the Quality of Experience (QoE) of the 5G service due to the characteristics of the transport infrastructure.

Consider an example scenario with LADN deployment, in which the typical purpose to create a LAN service among wireless devices (or user equipments (UE)) belonging to the same organization or enterprise. It can be observed that most of the traffic and services is among wireless devices that are be geographically distributed in a multi-site organization. In existing solutions, the enterprise company deploying the LADN stipulates dedicated contracts for PLMN leased line services among their main Edge Computing sites, in order to interconnect and support their IT infrastructure. The enterprise company then pays for Wide Area Network (WAN) leased lines in order to secure dedicated connectivity among their enterprise wireless devices, while the Mobile Network Operator (MNO) ensures the local connectivity in each area.

With the advent of smart working and full 5G mobility, the state-of-art technology for LADN enterprise cannot easily scale-up with the mobility of the enterprise's wireless devices since the wireless devices might be distributed and/or aggregated in many different geographical sites and their distribution may vary in time and density so it is not easily predictable.

Creating LADN services in the location of each wireless device would be expensive and may not be feasible or efficient for the MNO operator.

Embodiments described herein therefore introduce the concept of a LADN server extension (or remotization) by means of an underlying transport network. In embodiments described herein therefore, a MNO may centralize the LADN service functions in a dedicated Mobile Edge Computing (MEC) server host and support wireless device access to the LADN server from remote locations by creating dedicated transport tunnels to the remote sites.

In embodiments described herein the edge Computing system and the 5G Transport system may collaboratively interact in traffic routing and policy control related operations, and the User Plane Function (UPF) may be used to integrate the Edge Computing deployment in a 5G network.

The following concepts may be utilised in providing high performance Edge Computing services recommended by 3GPP Edge computing recommendation like 23.501 with great quality of experience:
  Concurrent access to local and central Data Networks (DN) in a single PDU session
  Selection of the User Plane Function for a PDU session close to the UE's point of attachment
  Selection/establishment of a new UPF based on UE mobility and connectivity related events received from the Session Management Function (SMF)
  Network Capability Exposure to allow an AF (Application Function) in the Edge Computing server to request information about UE(s) or request actions towards UE(s)
  Possibility for an Edge Computing AF to influence traffic steering for a single UE or a group of UEs
  Indication about LADN availability for UEs (Local Access Data Network) for specific and local Edge Computing services Embodiments described herein may exploit the aforementioned concepts and may then reduce the dependency on the underlying PLMN network by creating a LADN extension network within the MNO network towards a set of predefined PGWs.

Figure 2A:
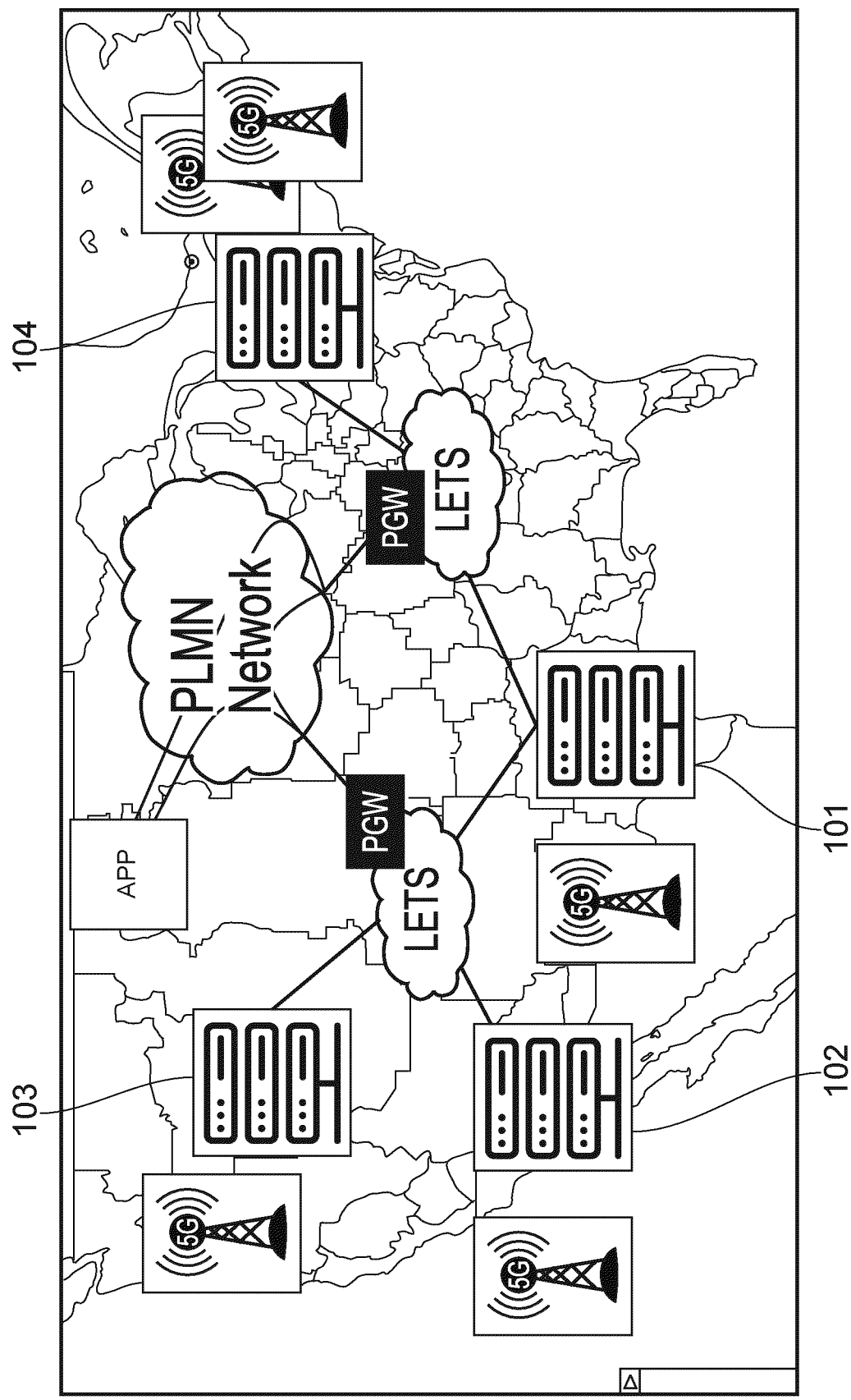
FIG. 2*a* illustrates an example of the extended LADN network according some embodiments of the invention.

FIG. 2a illustrates an example of the extended LADN network according some embodiments of the invention. In this example, PGW-proxy sites are interconnected via a dedicated transport service to the distributed cloud sites supporting active LADN sessions.

For example, the plurality of MEC server hosts 101-104 which in FIG. 1 provided individual LADN services, may, in some embodiments, be interconnected by a transport network. For example, the MEC server hosts 101, 102 and 103 may be connected by dynamically created transport channels. In this way, any wireless device connected to the MEC server host 102 or 103 requested access to the LADN service provided by the MEC server host 101, may be able to access the LADN server provided by the MEC server host 101 via the dynamically created transport channels.

Any LADN service instance is connected to the PGW-proxy sites and to the PLMN for supporting the LADN service for all UEs belonging to the same LADN (e.g. all users within the same enterprise network).

Figure 2B:
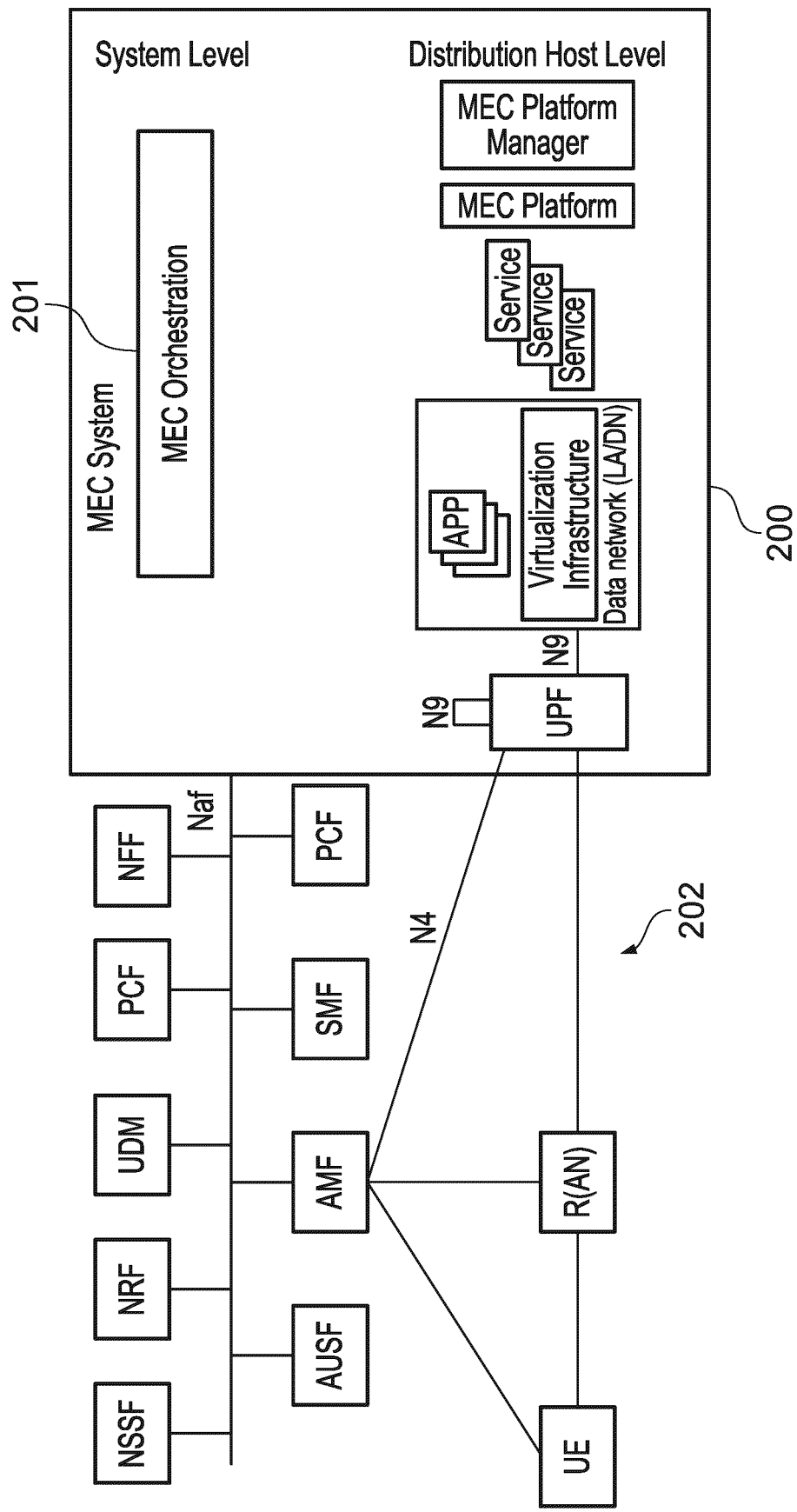
FIG. 2*b* illustrates an example of a MEC server host in communication with a 5G core network of a mobile network operator (MNO)

FIG. 2b illustrates an example of a MEC server host 200 in communication with a 5G core network 202 of a mobile network operator (MNO).

The MEC server host 200 communicates with the UPF of the core network, acting as an application function. The LADN of the MEC server host 200 may then provide local services to a wireless device which is connected to the radio access network, via the UPF. An MEC Orchestrator 201 communicates with the network exposure function NEF of the core network and registers subscriptions and provisioning of MEC services.

Figure 2C:
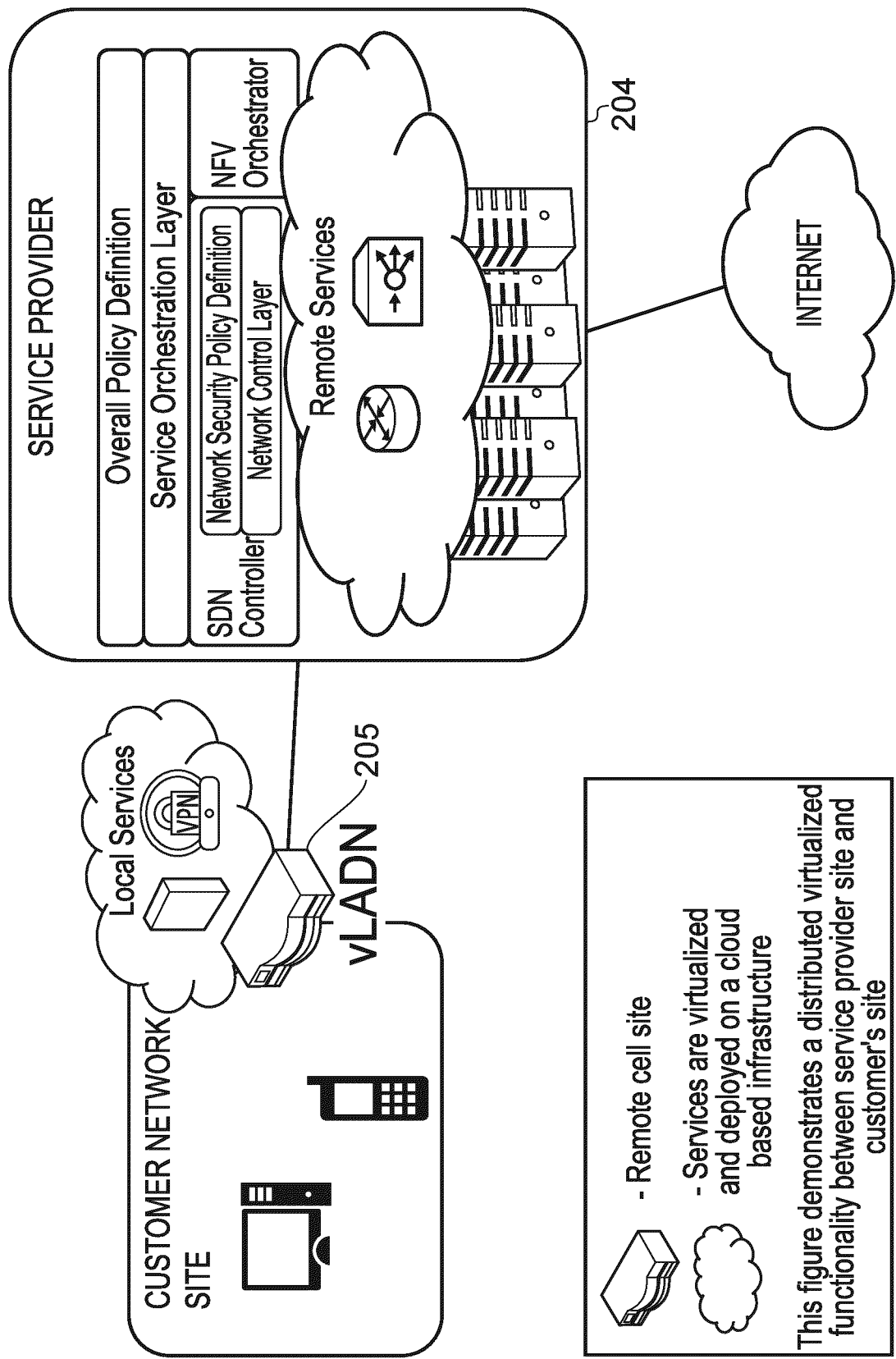
FIG. 2*c* illustrates a distributed virtual functionality between a service provider and a MEC server host.

FIG. 2c illustrates a distributed virtual functionality between a service provider 204 and a MEC server host 205. Some services will be available at the customer network site locally via the vLADN. Other services are available remotely at the service provider 204.

Figure 3:
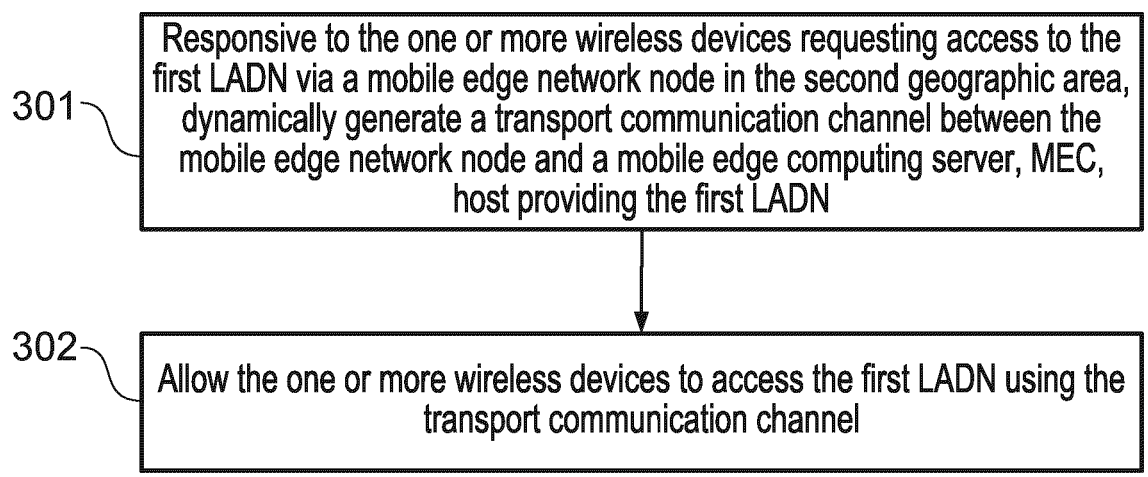
FIG. 3 illustrates a method in a mobile communication network for providing access to a 5G local area data network, LADN as specified in 3GPP specifications, to one or more wireless devices positioned in a second geographic area outside of a first geographic area associated with a first LADN.

FIG. 3 illustrates a method in a mobile communication network for providing access to a first local area data network, LADN, to one or more wireless devices positioned in a second geographic area outside of a first geographic area associated with a first LADN. In some examples, the method may be performed by the core network. The first LADN may be a LADN as specified in 3GPP specifications.

In step 301 the method comprises responsive to the one or more wireless devices requesting access to the first LADN via a mobile edge network node in the second geographic area, dynamically generating a transport communication channel between the mobile edge network node and a mobile edge computing server, MEC, host providing the first LADN. The mobile edge network node may for example comprise another MEC host, which may support a UPF. For example, the mobile edge network node may comprise a User Plane Function (UPF).

Figure 7:
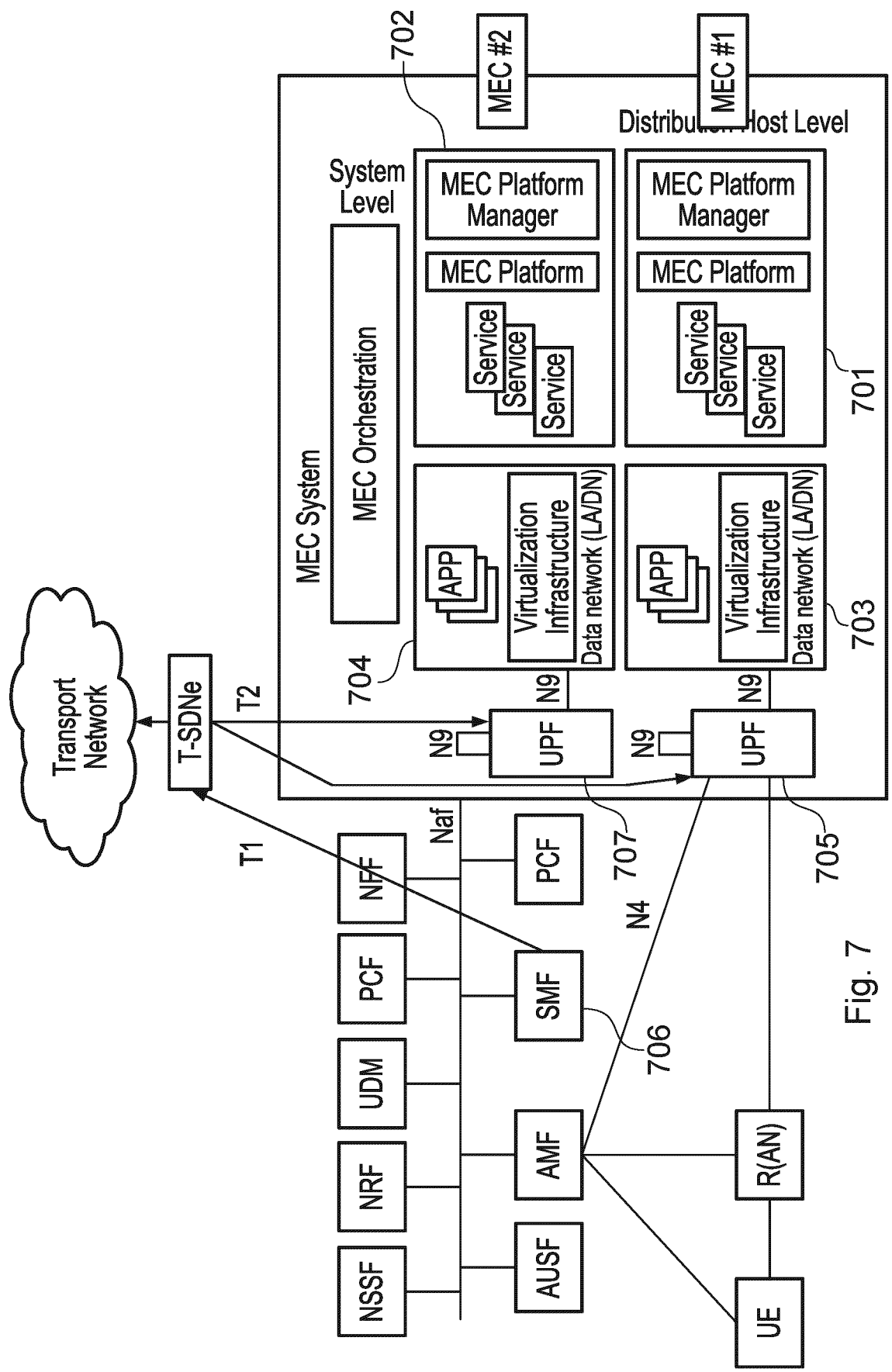
FIG. 7 illustrates an example of a first MEC server host and a second MEC server host.

The core network node may dynamically generate the transport communication channel by requesting that a software defined network, SDN, controller, control generation of the transport communication channel over an Internet Protocol, IP. For example, a UPF or SMF may control a transport SDN (T-SDN) to dynamically generate the transport communication channel. As illustrated in FIG. 7 the T-SDN may communicate with the MEC hosts (via respective UPFs) utilizing a T2 interface.

In step 302, the method comprises allowing the one or more wireless devices to access the first LADN using the transport communication channel. In other words, by making use of the dynamically provisioned transport channel, the one or more wireless devices that are located outside of the first geographic area associated with the first LADN, may gain access to the LADN.

Figure 4:
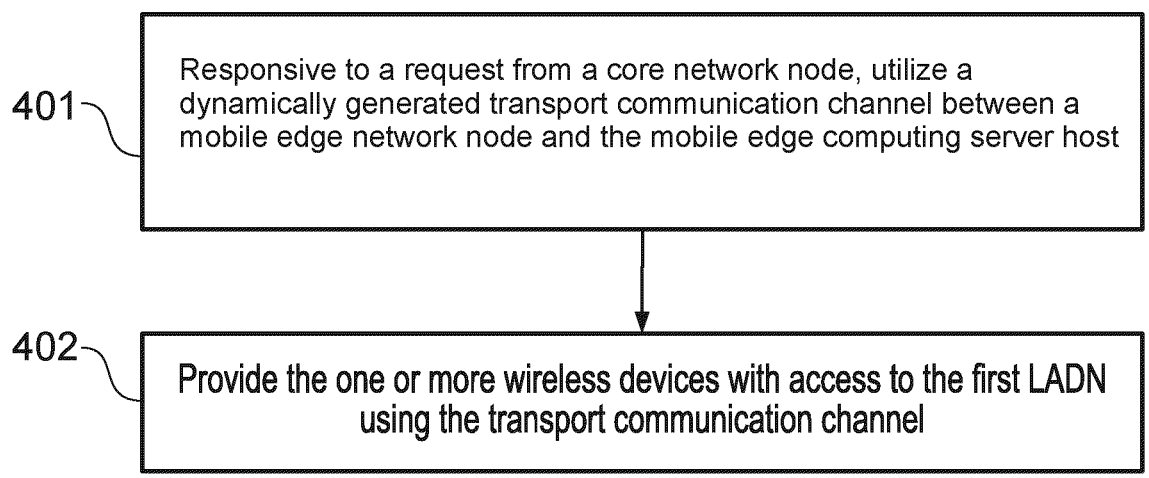
FIG. 4 illustrates a method in a mobile edge network node serving communicating with one or more wireless devices located in a second geographic area outside of a first geographic area.

FIG. 4 illustrates a method in a mobile edge network node communicating with one or more wireless devices located in a second geographic area outside of a first geographic area.

In step 401, responsive to a request from a core network node, for example a User Plane Function (UPF), utilizing a dynamically generated transport communication channel between the mobile edge network node and a mobile edge computing server, MEC, host providing a first LADN to a first geographic area outside of the second geographic area.

In step 402, the mobile edge network node providing the one or more wireless device with access to the first LADN using the transport communication channel.

In some examples, the method of FIG. 4 may be performed by a mobile edge network node that does not itself provide a local area data network. In some examples the mobile edge network node may comprise a second MEC server host.

Figure 5:
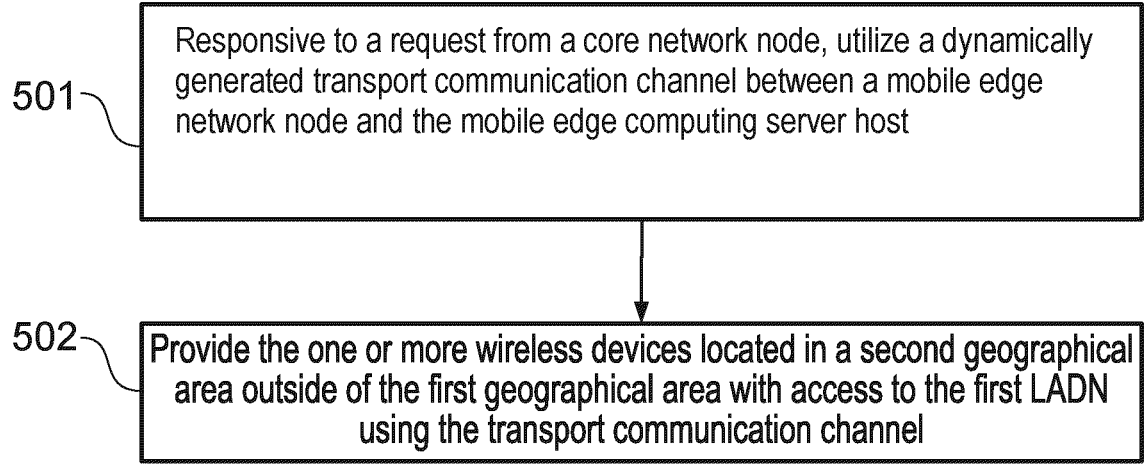
FIG. 5 illustrates a method in a mobile edge computing, MEC, server host providing a first local area data network, LADN, in a first geographical area.

FIG. 5 illustrates a method in a mobile edge computing, MEC, server host providing a first local area data network, LADN, in a first geographical area.

In step 501, the MEC server host, responsive to a request from a core network node, for example the UPF, utilizes a dynamically generated transport communication channel between a mobile edge network node and the MEC server host.

In step 502, the MEC server host, provides access to the first LADN to the one or more wireless devices located in a second geographical area outside of the first geographical area using the transport communication channel.

The methods descried in FIGS. 3 to 5 therefore extend the provisioning of the LADN meaning an enterprise may not have to provide multiple LADNs in different locations, or that wireless devices that are mobile may be able to access a LADN when outside of the area in which they would usually be to access the LADN.

In embodiments described herein, it will be appreciated that the LETS (LADN Extension Transport Services) (i.e. the dynamically provisioned transport channels) allows for the realization of a seamless LADN extension, or distributed cloud interconnection, without any dependency from the PLMN whenever possible, and in a completely transparent way to the wireless device and the end user.

In some examples, the method of FIG. 3 comprises performing the step of dynamically generating the transport communication channel responsive to user traffic to the first LADN from the one or more wireless devices meeting a first criterion. For example, the user traffic may be determined to meet a first criterion if the one or more wireless devices comprises greater than a predetermined number of wireless devices. Additionally or alternatively, the user traffic may be determined to meet the first criterion if the one or more wireless devices comprises a wireless device having priority access rights. For example, a particular wireless device may have access to a higher priority subscription with a MNO, in which case, the access to the LADN may be guaranteed even when the particular mobile device is not in the local area associated with the LADN.

The method may further comprise responsive to determining that the user traffic to the one or more wireless devices no longer meets the first criterion, deactivating the transport communication channel.

In some examples, dynamically generating the transport communication channel comprises dimensioning the transport communication channel in order to support a Service Level Agreement associated with the first LADN. In some examples, the step of dynamically generating the transport communication channel is controlled by a software defined network, SDN, controller, over an Internet Protocol, IP, network.

Figure 6:
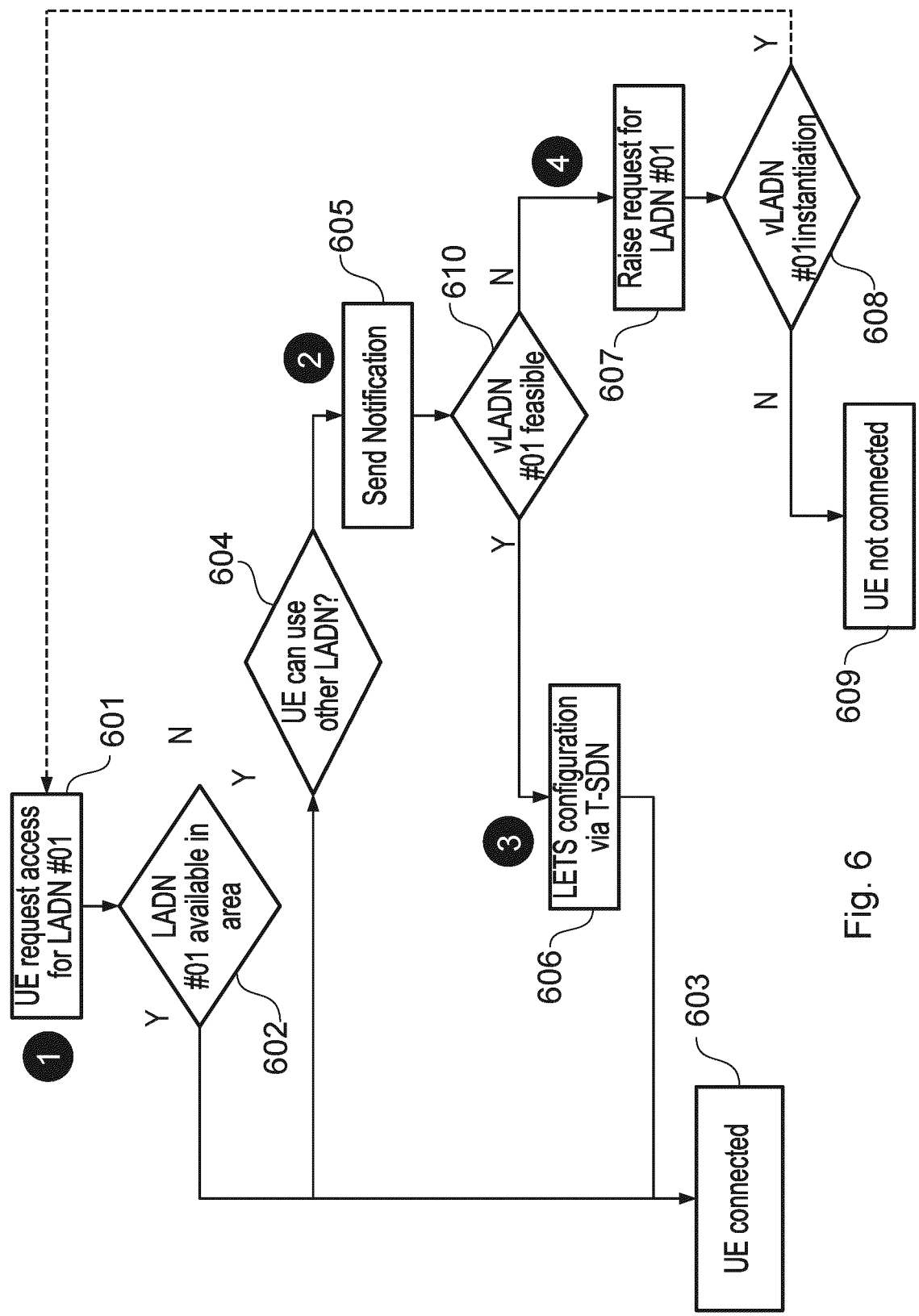
FIG. 6 illustrates an example implementation of the methods of FIGS. 3 to 5.

FIG. 6 illustrates an example implementation of the methods of FIGS. 3 to 5. The method of FIG. 4 allows for determination of whether the appropriate transport connection is available and/or compatible, and whether the transport connection can provide sufficient capacity to satisfy the aggregated wireless devices requirements within the contracted Service Level Agreement (SLA), as well as the security and latency required by the enterprise network.

In the following the current 3GPP Core function architecture is explained where the MEC Orchestrator allocates the MEC Host to support the LADN service in the UE serving area.

In step 601, a wireless device checks the available LADN services in the geographical area according to the user privileges and user selection of the wireless device. For example, the user may be subscribed with a first LADN service provided by a first MEC server host 101. For example, the wireless device may transmit a message to the core network indicating the LADN that the wireless device is registered to. The message may also comprise an indication of the local service(s) provided by the LADN that the wireless device preferred.

In step 602, the method comprises determining if the first LADN is available in geographical area that the wireless device is in. If the wireless device is located in the first geographical area associated with the first LADN, the method passes to step 603 in which the wireless device connects to the first LADN in the normal way.

If the wireless device is located in a second geographic area outside of the first geographical area, the method passes to step 604. In step 604, it is determined whether a second LADN is available in the area that the wireless device is authorised to use. If there is a second LADN available in the second are that the wireless device is authorised to use, then the method passes to step 603 in which the wireless device connects to the second LADN.

If the wireless device is not authorised to use the second LADN, or there is no second LADN available, the method passes to step 605 in which the a notification may be transmitted to the core network via a Network Exposure Function (NEF), to verify if the first LADN can be extended to serve the wireless device in the second geographic area.

For example, the core network may request the Transport SDN Controller to determine whether the transport communication channel is capable of supporting the traffic of the one or more wireless devices to the first LADN. In particular the Transport SDN Controller may determine whether the transport communication channel is capable of supporting the traffic of the one or more wireless devices to the first LADN whilst meeting Quality of Experience targets associated with the first LADN.

If the transport communication channel is capable of supporting the user traffic to the first LADN, the method passes to step 606 which comprises dynamically generating the transport communication channel responsive to determining that the transport communication channel is capable of supporting user traffic to the one or more wireless devices. Step 606 may be controlled by the UPF via the Transport SDN Controller. The method may then pass to step 603 in which the wireless device connects to the first LADN via the transport communication channel.

If in step 605 the Transport SDN Controller determines that the transport communication channel is not capable of supporting the user traffic from the one or more wireless devices to the first LADN, the method passes to steps 607 and 608 which comprise allowing the one or more wireless devices to access a second LADN. In this example, the mobile network edge node that the wireless device is connected to may comprise a second MEC server host providing a second LADN to the second geographic area.

Step 607 may comprise transmitting a request to the core network to access a LADN service in the second geographic area. Alternatively, step 607 may comprise transmitting a request to the core network, for example to the UPF, to access an existing second LADN provided by the second MEC server host.

Responsive to transmitting the request to access a LADN service in the second geographic area, the core network may for example, allow the wireless device access to an existing second LADN in the second geographic area, or may instantiate a new LADN in the second geographic area.

If, in step 608, the instantiation is successful, and/or the core network determines that the wireless device should be allowed access to a LADN service, then the method passes back to step 601.

If, in step 608, the instantiation is unsuccessful, and/or the core network determines that the wireless device should not be allowed access to a LADN service, the method passes to step 609 in which the wireless device remains unconnected to a LADN. In this scenario, the wireless device may request access to the services required by the PLMN.

In this example illustrated in FIG. 4, the option of extending first LADN to the second geographic area using the dynamic transport communication channel is preferred over allowing the wireless device access to the second LADN as it is more dynamic with respect to NFV service orchestration and the Quality of Experience (QoE) may be secured directly by the MNO.

FIG. 7 illustrates an example of a first MEC server host 701 and a second MEC server host 702 in communication with a 5G core network 200 of a mobile network operator (MNO). The first MEC server host 701 is associated with the first LADN 703, and the second MEC server host 702 is associated with the second LADN 704.

The first MEC server host 701 may request access to the second LADN 704 associated with the second MEC server host 702 over the N6 interface to the first UPF 705.

The core network may then, in this example, dynamically generate the transport communication channel between the first MEC server host 701 and the second MEC server host 702 by the following:

The first UPF 705 may forward the request for access to the first LADN 703 to the SMF 706. The SMF 706 may then utilize the T1 interface to a transport Software Defined Networking Function (T-SDN) to request creation of the transport communication channel. The T-SDN may then create the transport communication channel and may communicate the extension of the first LADN to the second MEC server host 702 over the T2 interface to both the first UPF 705 and the second UPF 707.

Figure 8:
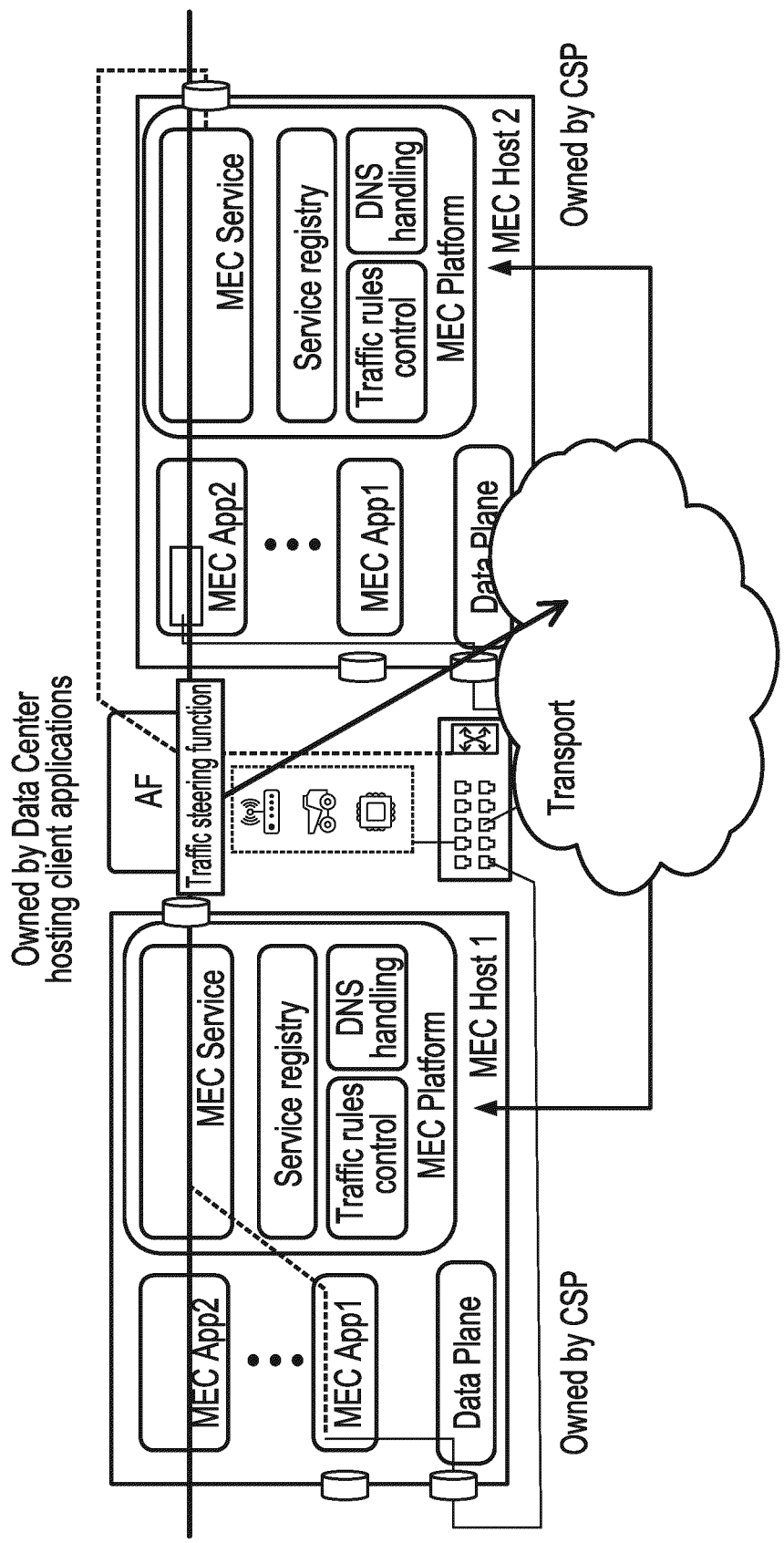
FIG. 8 illustrates how the LADN service extension (LETS) can be managed within the MNO network without affecting the application function layer of the core network and therefore without affecting the enterprise network.

FIG. 8 illustrates how the LADN service extension (LETS) can be managed within the MNO network without affecting the application function layer of the core network and therefore without affecting the enterprise network.

The MEC host 1 and MEC host 2 may be in communication using a dynamically generated transport channel. In this way one or more wireless devices connected to the MEC host 1 may utilize a LADN provisioned by the MEC host 2 without needing to transmit traffic to the application function in the core network.

In this way the MNO may offer to either privileged platinum customers, or to groups of customers locates out of the usual geographic areas, the ubiquitous LADN service offering the same access type in different locations with same QoE by allocating dynamically the transport capacity among MEC servers.

The LETS Transport network makes the LADN service transparent to the Application functions so that any application is connected to the PDU anchor point, independently from the wireless device position.

Figure 9:
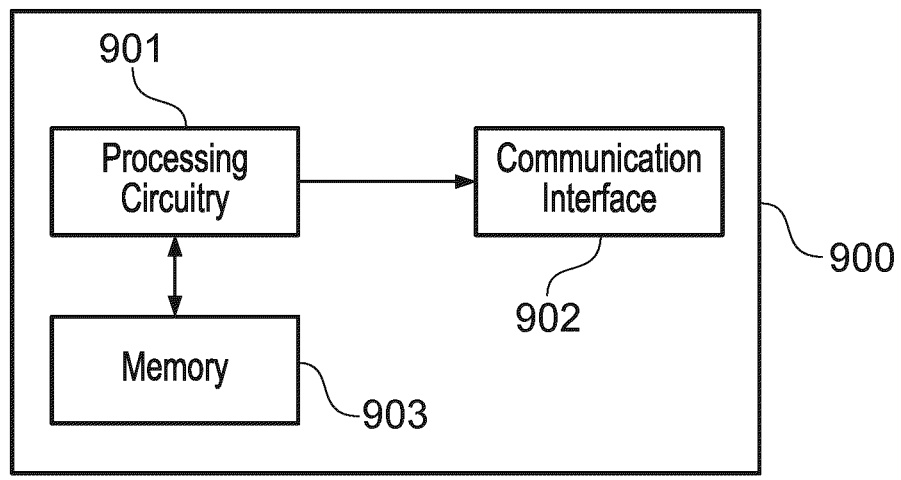
FIG. 9 illustrates a core network node comprising processing circuitry (or logic)

FIG. 9 illustrates a core network node 900 comprising processing circuitry (or logic) 901. The processing circuitry 901 controls the operation of the core network node 900 and can implement the method described herein in relation to a core network node 900. The core network node 900 may comprise a Session Management Function (SMF). The processing circuitry 901 can comprise one or more processors, processing units, multi-core processors or modules that are configured or programmed to control the core network node 900 in the manner described herein. In particular implementations, the processing circuitry 901 can comprise a plurality of software and/or hardware modules that are each configured to perform, or are for performing, individual or multiple steps of the method described herein in relation to the core network node 900.

Briefly, the processing circuitry 901 of the core network node 900 is configured to: responsive to the one or more wireless devices requesting access to the first LADN via an mobile edge network node in the second geographic area, dynamically generating a transport communication channel between the mobile edge network node and a mobile edge computing server, MEC, host providing the first LADN, and allowing the one or more wireless devices to access the first LADN using the transport communication channel.

In some embodiments, the core network node 900 may optionally comprise a communications interface 902. The communications interface 902 of the core network node 900 can be for use in communicating with other nodes, such as other virtual nodes. For example, the communications interface 902 of the core network node 900 can be configured to transmit to and/or receive from other nodes requests, resources, information, data, signals, or similar. The processing circuitry 901 of core network node 900 may be configured to control the communications interface 902 of the core network node 900 to transmit to and/or receive from other nodes requests, resources, information, data, signals, or similar.

Optionally, the core network node 900 may comprise a memory 903. In some embodiments, the memory 903 of the core network node 900 can be configured to store program code that can be executed by the processing circuitry 901 of the core network node 900 to perform the method described herein in relation to the core network node 900. Alternatively or in addition, the memory 903 of the core network node 900, can be configured to store any requests, resources, information, data, signals, or similar that are described herein. The processing circuitry 901 of the core network node 900 may be configured to control the memory 903 of the core network node 900 to store any requests, resources, information, data, signals, or similar that are described herein.

Figure 10:
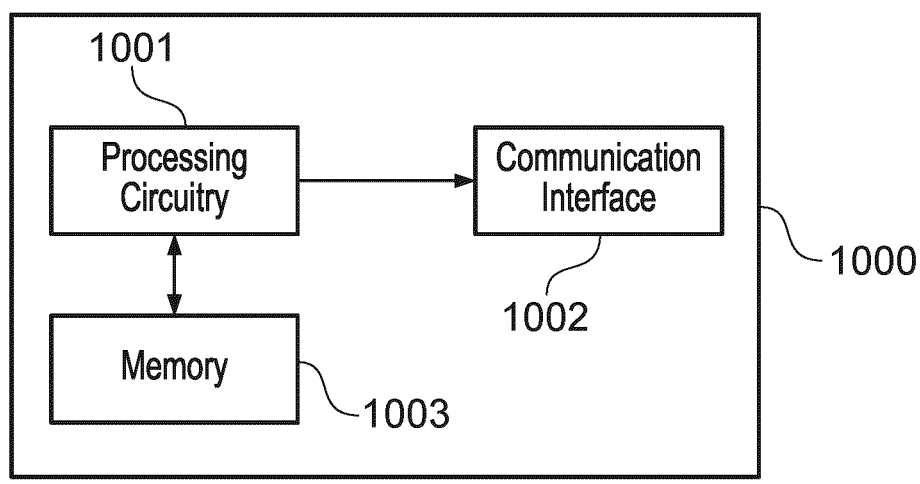
FIG. 10 illustrates a mobile edge network node comprising processing circuitry (or logic)

FIG. 10 illustrates a mobile edge network node 1000 comprising processing circuitry (or logic) 1001. The processing circuitry 1001 controls the operation of the mobile edge network node 1000 and can implement the method described herein in relation to a mobile edge network node 1000. The mobile edge network node 1000 may comprise a packet gateway node (PGW) or a MEC server host. The processing circuitry 1001 can comprise one or more processors, processing units, multi-core processors or modules that are configured or programmed to control the mobile edge network node 1000 in the manner described herein. In particular implementations, the processing circuitry 1001 can comprise a plurality of software and/or hardware modules that are each configured to perform, or are for performing, individual or multiple steps of the method described herein in relation to the mobile edge network node 1000.

Briefly, the processing circuitry 1001 of the mobile edge network node 1000 is configured to: responsive to a request from a core network node, utilizing a dynamically generated transport communication channel between the mobile edge network node and a mobile edge computing server, MEC, host providing a first LADN to a first geographic area outside of the second geographic area, and provide the one or more wireless devices with access to the first LADN using the transport communication channel.

In some embodiments, the mobile edge network node 1000 may optionally comprise a communications interface 1002. The communications interface 1002 of the mobile edge network node 1000 can be for use in communicating with other nodes, such as other virtual nodes. For example, the communications interface 1002 of the mobile edge network node 1000 can be configured to transmit to and/or receive from other nodes requests, resources, information, data, signals, or similar. The processing circuitry 1001 of mobile edge network node 1000 may be configured to control the communications interface 1002 of the mobile edge network node 1000 to transmit to and/or receive from other nodes requests, resources, information, data, signals, or similar.

Optionally, the mobile edge network node 1000 may comprise a memory 1003. In some embodiments, the memory 1003 of the mobile edge network node 1000 can be configured to store program code that can be executed by the processing circuitry 1001 of the mobile edge network node 1000 to perform the method described herein in relation to the mobile edge network node 1000. Alternatively or in addition, the memory 1003 of the mobile edge network node 1000, can be configured to store any requests, resources, information, data, signals, or similar that are described herein. The processing circuitry 1001 of the mobile edge network node 1000 may be configured to control the memory 1003 of the mobile edge network node 1000 to store any requests, resources, information, data, signals, or similar that are described herein.

Figure 11:
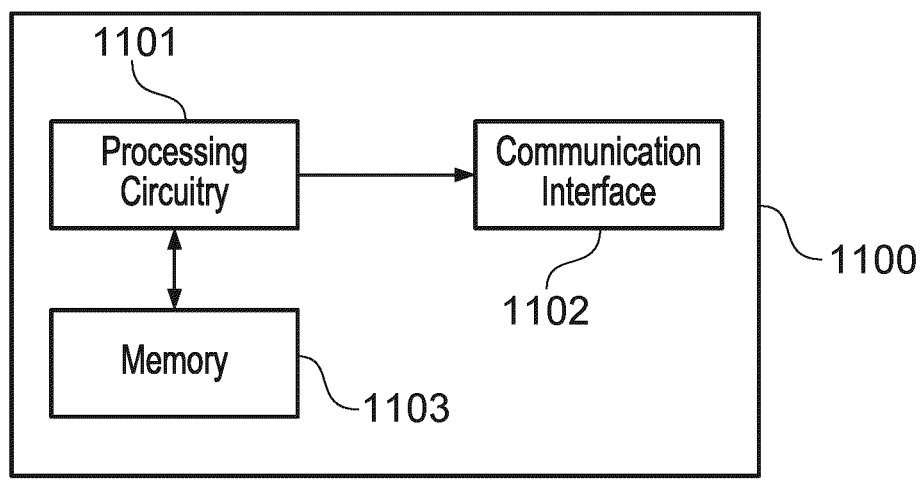
FIG. 11 illustrates a MEC server host comprising processing circuitry (or logic).

FIG. 11 illustrates a MEC server host 1100 comprising processing circuitry (or logic) 1101. The processing circuitry 1101 controls the operation of the MEC server host 1100 and can implement the method described herein in relation to a MEC server host 1100. The MEC server host 1100 may comprise a packet gateway node (PGW) or a MEC server host. The processing circuitry 1101 can comprise one or more processors, processing units, multi-core processors or modules that are configured or programmed to control the MEC server host 1100 in the manner described herein. In particular implementations, the processing circuitry 1101 can comprise a plurality of software and/or hardware modules that are each configured to perform, or are for performing, individual or multiple steps of the method described herein in relation to the MEC server host 1100.

Briefly, the processing circuitry 1101 of the MEC server host 1100 is configured to: responsive to a request from a core network node, utilizing a dynamically generated transport communication channel between a mobile edge network node and the MEC server host, and provide the one or more wireless devices located in a second geographic area outside of the first geographical area with access to the first LADN using the transport communication channel.

In some embodiments, the MEC server host 1100 may optionally comprise a communications interface 1102. The communications interface 1102 of the MEC server host 1100 can be for use in communicating with other nodes, such as other virtual nodes. For example, the communications interface 1102 of the MEC server host 1100 can be configured to transmit to and/or receive from other nodes requests, resources, information, data, signals, or similar. The processing circuitry 1101 of MEC server host 1100 may be configured to control the communications interface 1102 of the MEC server host 1100 to transmit to and/or receive from other nodes requests, resources, information, data, signals, or similar.

Optionally, the MEC server host 1100 may comprise a memory 1103. In some embodiments, the memory 1103 of the MEC server host 1100 can be configured to store program code that can be executed by the processing circuitry 1101 of the MEC server host 1100 to perform the method described herein in relation to the MEC server host 1100. Alternatively or in addition, the memory 1103 of the MEC server host 1100, can be configured to store any requests, resources, information, data, signals, or similar that are described herein. The processing circuitry 1101 of the MEC server host 1100 may be configured to control the memory 1103 of the MEC server host 1100 to store any requests, resources, information, data, signals, or similar that are described herein.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a mobile communication network for providing access to a first local area data network, LADN, to one or more wireless devices positioned in a second geographic area outside of a first geographic area associated with the first LADN, the method comprising:

responsive to the one or more wireless devices requesting access to the first LADN via an mobile edge network node in the second geographic area, dynamically generating a transport communication channel between the mobile edge network node and a mobile edge computing server host providing the first LADN, the dynamically generating the transport communication channel being responsive to user traffic to and/or from the one or more wireless devices meeting a first criterion, the user traffic meeting the first criterion when a number of the one or more wireless devices is greater than a predetermined number; and allowing the one or more wireless devices to access the first LADN using the transport communication channel.

2. The method as claimed in claim 1, wherein the user traffic meets the first criterion if the one or more wireless devices comprises a wireless device having priority access rights.

3. The method as claimed in claim 1, further comprising performing the step of dynamically generating the transport communication channel responsive to determining that the transport communication channel is capable of supporting user traffic to the one or more wireless devices.

4. The method as claimed in claim 3, wherein the network edge node comprises a second mobile edge computing host providing a second LADN to the second geographic area, and wherein the method further comprises responsive to determining that the transport communication channel is not capable of supporting the user traffic to the one or more wireless device, allowing the one or more wireless devices to access the second LADN.

5. The method as claimed in claim 1, wherein the step of dynamically generating the transport communication comprises dimensioning the transport communication channel in order to support a Service Level Agreement associated with the first LADN.

6. The method as claimed in claim 1, further comprising, responsive to determining that the user traffic to the one or more wireless devices no longer meets the first criterion, deactivating the transport communication channel.

7. The method as claimed in claim 1, wherein the step of dynamically generating the transport communication channel is controlled by a software defined network, SDN, controller, over an Internet Protocol, IP, network.

8. A method in a mobile edge network node communicating with one or more wireless devices located in a second geographic area outside of a first geographic area, the method comprising:

responsive to a request from a core network node, utilizing a dynamically generated transport communication channel between the mobile edge network node and a mobile edge computing server host providing a first LADN to a first geographic area outside of the second geographic area, the utilizing the dynamically generated transport communication channel further being responsive to user traffic to and/or from the one or more wireless devices meeting a first criterion, the user traffic meeting the first criterion when a number of the one or more wireless devices is greater than a predetermined number; and providing the one or more wireless devices with access to the first LADN using the transport communication channel.

9. A core network for providing access to a first local area data network, LADN, to one or more wireless devices positioned in a second geographic area outside of a first geographic area associated with the first LADN; the core network comprising processing circuitry configured to:

responsive to the one or more wireless devices requesting access to the first LADN via an mobile edge network node in the second geographic area, dynamically generate a transport communication channel between the mobile edge network node and a mobile edge computing server host providing the first LADN, the dynamically generating the transport communication channel performed responsive to user traffic to the one or more wireless devices meeting a first criterion, the user traffic meeting the first criterion when a number of the one or more wireless devices is greater than a predetermined number; and allow the one or more wireless devices to access the first LADN using the transport communication channel.

10. The core network as claimed in claim 9, wherein the user traffic meets the first criterion if the one or more wireless devices comprises a wireless device having priority access rights.

11. The core network as claimed in claim 9, wherein the processing circuitry is further configured to:

perform the step of dynamically generating the transport communication channel responsive to determining that the transport communication channel is capable of supporting user traffic to the one or more wireless devices.

12. The core network as claimed in claim 11, wherein the network edge node comprises a second mobile edge computing server host providing a second LADN to the second geographic area, and wherein the processing circuitry is further configured to:

responsive to determining that the transport communication channel is not capable of supporting the user traffic to the one or more wireless device, allow the one or more wireless devices to access the second LADN.

13. The core network as claimed in claim 9, wherein the processing circuitry is configured to dynamically generate the transport communication by dimensioning the transport communication channel in order to support a Service Level Agreement associated with the first LADN.

14. The core network as claimed in claim 9, wherein the processing circuitry is further configured to:

responsive to determining that the user traffic to the one or more wireless devices no longer meets the first criterion, deactivate the transport communication channel.

15. The core network as claimed in claim 9, wherein the processing circuitry is configured to perform the step of dynamically generating the transport communication channel by controlling a software defined network, SDN, controller, over an Internet Protocol, IP, network.

16. A mobile edge network node communicating with one or more wireless devices located in a second geographic area outside of a first geographic area, the mobile edge network node comprising processing circuitry configured to:

responsive to a request from a core network node, utilize a dynamically generated transport communication channel between the mobile edge network node and a mobile edge computing server host providing a first LADN to a first geographic area outside of the second geographic area, the utilizing the dynamically generated transport communication channel further being responsive to user traffic to and/or from the one or more wireless devices meeting a first criterion, the user traffic meeting the first criterion when a number of the one or more wireless devices is greater than a predetermined number; and provide the one or more wireless devices with access to the first LADN using the transport communication channel.

* * * * *